United States Patent
Wu et al.

(10) Patent No.: US 11,595,898 B2
(45) Date of Patent: Feb. 28, 2023

(54) PAGING IN VEHICLE TO EVERYTHING COMMUNICATIONS FOR POWER SAVING

(71) Applicant: QUALCOMM Incorporated, San Diego, CA (US)

(72) Inventors: Shuanshuan Wu, San Diego, CA (US); Anantharaman Balasubramanian, San Diego, CA (US); Kapil Gulati, Belle Mead, NJ (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 42 days.

(21) Appl. No.: 17/247,728

(22) Filed: Dec. 21, 2020

(65) Prior Publication Data

US 2021/0227468 A1    Jul. 22, 2021

Related U.S. Application Data

(60) Provisional application No. 62/962,020, filed on Jan. 16, 2020.

(51) Int. Cl.
| | |
|---|---|
| *H04W 4/00* | (2018.01) |
| *H04W 68/00* | (2009.01) |
| *G08G 1/00* | (2006.01) |
| *H04W 52/02* | (2009.01) |
| *H04W 68/02* | (2009.01) |
| *H04W 72/04* | (2023.01) |
| *H04W 60/00* | (2009.01) |
| *H04W 4/40* | (2018.01) |

(52) U.S. Cl.
CPC ......... *H04W 52/0229* (2013.01); *H04W 4/40* (2018.02); *H04W 60/00* (2013.01); *H04W 68/005* (2013.01); *H04W 68/02* (2013.01); *H04W 72/0406* (2013.01)

(58) Field of Classification Search
CPC ... H04W 52/0229; H04W 4/40; H04W 60/00; H04W 68/005; H04W 68/02; H04W 72/0406
USPC .......................................................... 370/329
See application file for complete search history.

(56) References Cited

U.S. PATENT DOCUMENTS

| | | | |
|---|---|---|---|
| 2009/0174572 A1* | 7/2009 | Smith | G08G 1/0965 340/902 |
| 2016/0210859 A1* | 7/2016 | Grotendorst | G08G 1/162 |
| 2017/0245245 A1* | 8/2017 | Kim | H04W 72/1284 |

(Continued)

FOREIGN PATENT DOCUMENTS

WO    2018199652 A1    11/2018

OTHER PUBLICATIONS

International Search Report and Written Opinion—PCT/US2020/070947—ISA/EPO—dated Apr. 13, 2021.

*Primary Examiner* — Mark G. Pannell
(74) *Attorney, Agent, or Firm* — Harrity & Harrity, LLP

(57) ABSTRACT

Various aspects of the present disclosure generally relate to paging in vehicle to everything (V2X) communications for power saving. In some aspects, a user equipment (UE) may monitor for a wake up signal or a paging message from a wireless communication device and monitor for V2X messages from vehicle UEs based at least in part on receiving the wake up signal or the paging message. The UE may receive a V2X message from a vehicle UE based at least in part on the monitoring. Numerous other aspects are provided.

30 Claims, 8 Drawing Sheets

(56) References Cited

U.S. PATENT DOCUMENTS

| | | | |
|---|---|---|---|
| 2017/0279858 A1* | 9/2017 | Atarius | H04L 65/1006 |
| 2017/0374642 A1* | 12/2017 | Lee | H04W 76/10 |
| 2018/0047284 A1* | 2/2018 | Narasimha | G08G 1/094 |
| 2018/0152819 A1* | 5/2018 | Pinheiro | H04L 69/22 |
| 2018/0159935 A1* | 6/2018 | Cavalcanti | H04L 67/12 |
| 2018/0227718 A1* | 8/2018 | Lu | H04W 4/06 |
| 2018/0310147 A1 | 10/2018 | Kim et al. | |
| 2018/0368191 A1* | 12/2018 | Vutukuri | H04W 4/70 |
| 2020/0053647 A1 | 2/2020 | Chae et al. | |
| 2020/0092814 A1* | 3/2020 | Zhou | H04L 5/0053 |
| 2021/0297841 A1* | 9/2021 | Jung | H04W 68/005 |

\* cited by examiner

PAGING IN VEHICLE TO EVERYTHING COMMUNICATIONS FOR POWER SAVING

CROSS-REFERENCE TO RELATED APPLICATION

This patent application claims priority to U.S. Provisional patent Application No. 62/962,020, filed on Jan. 16, 2020, entitled "PAGING IN VEHICLE TO EVERYTHING COMMUNICATIONS FOR POWER SAVING," and assigned to the assignee hereof. The disclosure of the prior application is considered part of and is incorporated by reference in this patent application.

FIELD OF THE DISCLOSURE

Aspects of the present disclosure generally relate to wireless communication and particularly to techniques and apparatuses for paging in vehicle to everything communications for power saving.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include monitoring for a wake up signal or a paging message from a wireless communication device, monitoring for vehicle to everything (V2X) messages from vehicle UEs based at least in part on receiving the wake up signal or the paging message, and receiving a V2X message from a vehicle UE based at least in part on the monitoring.

In some aspects, a method of wireless communication, performed by a wireless communication device, may include detecting a V2X message from a vehicle UE, and transmitting a wake up signal or a paging message to a UE based at least in part on detecting the V2X message.

In some aspects, a UE for wireless communication may include memory and one or more processors operatively coupled to the memory. The memory and the one or more processors may be configured to monitor for a wake up signal or a paging message from a wireless communication device, monitor for V2X messages from vehicle UEs based at least in part on receiving the wake up signal or the paging message, and receive a V2X message from a vehicle UE based at least in part on the monitoring.

In some aspects, a wireless communication device (e.g., a roadside unit) for wireless communication may include memory and one or more processors operatively coupled to the memory. The memory and the one or more processors may be configured to detect a V2X message from a vehicle UE and transmit a wake up signal or a paging message to a UE based at least in part on detecting the V2X message.

In some aspects, a non-transitory computer-readable medium may store one or more instructions for wireless communication. The one or more instructions, when executed by one or more processors of a UE, may cause the one or more processors to monitor for a wake up signal or a paging message from a wireless communication device, monitor for V2X messages from vehicle UEs based at least in part on receiving the wake up signal or the paging message, and receive a V2X message from a vehicle UE based at least in part on the monitoring.

In some aspects, a non-transitory computer-readable medium may store one or more instructions for wireless communication. The one or more instructions, when executed by one or more processors of a wireless communication device, may cause the one or more processors to detect a V2X message from a vehicle UE, and transmit a wake up signal or a paging message to a UE based at least in part on detecting the V2X message.

In some aspects, an apparatus for wireless communication may include means for monitoring for a wake up signal or a paging message from a wireless communication device, means for monitoring for V2X messages from vehicle UEs based at least in part on receiving the wake up signal or the paging message, and means for receiving a V2X message from a vehicle UE based at least in part on the monitoring.

In some aspects, an apparatus for wireless communication may include means for detecting a V2X message from a vehicle UE and means for transmitting a wake up signal or a paging message to a UE based at least in part on detecting the V2X message.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
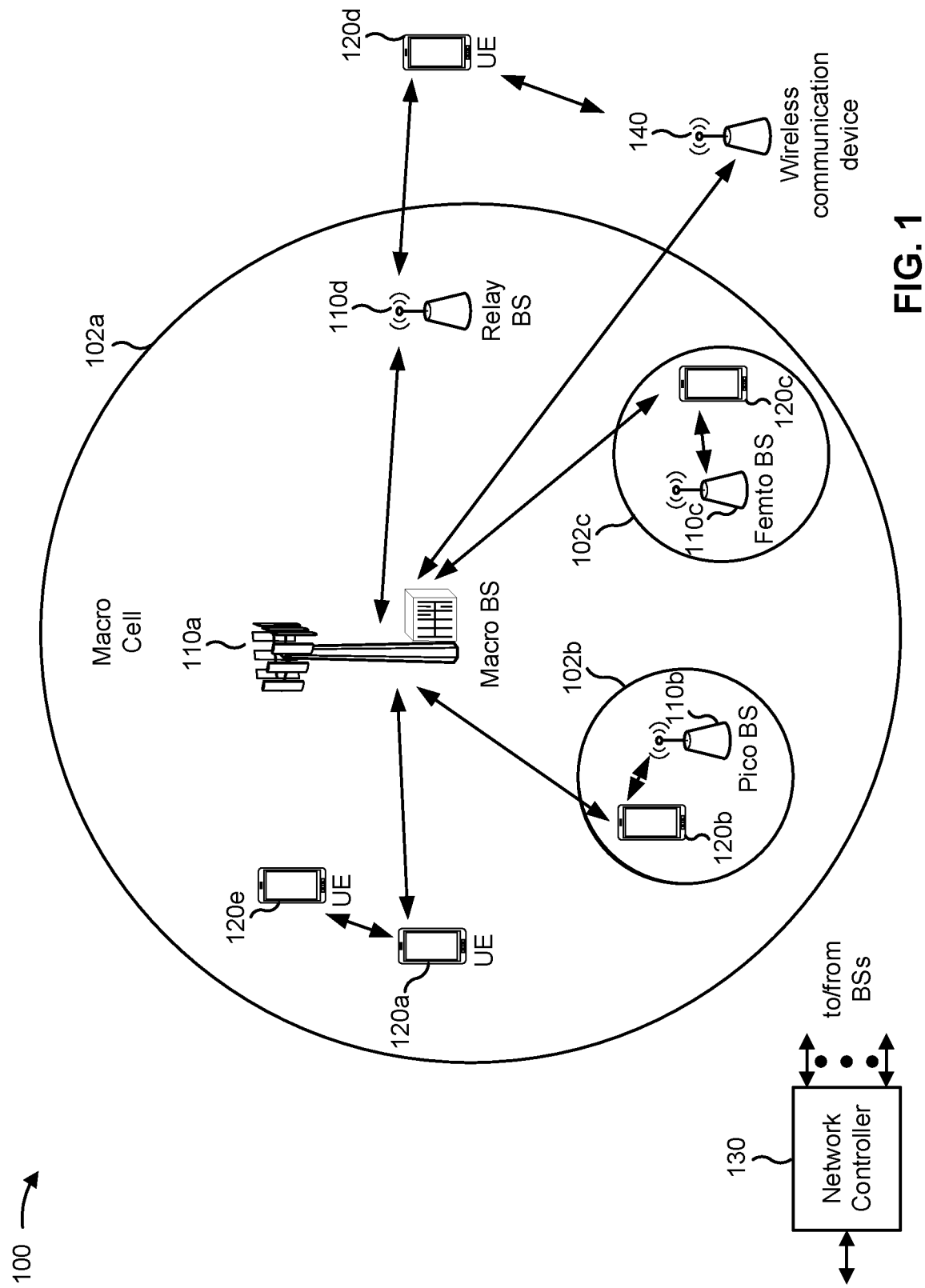
FIG. 1 is a block diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

Wireless network 100 may include a wireless communication device 140 that may communicate with UE 120. Wireless communication device 140 may communicate with BS 110. Wireless communication device 140 may be a roadside unit.

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station. UE 120 may communicate with wireless communication device 140 via sidelink communications or via a base station.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
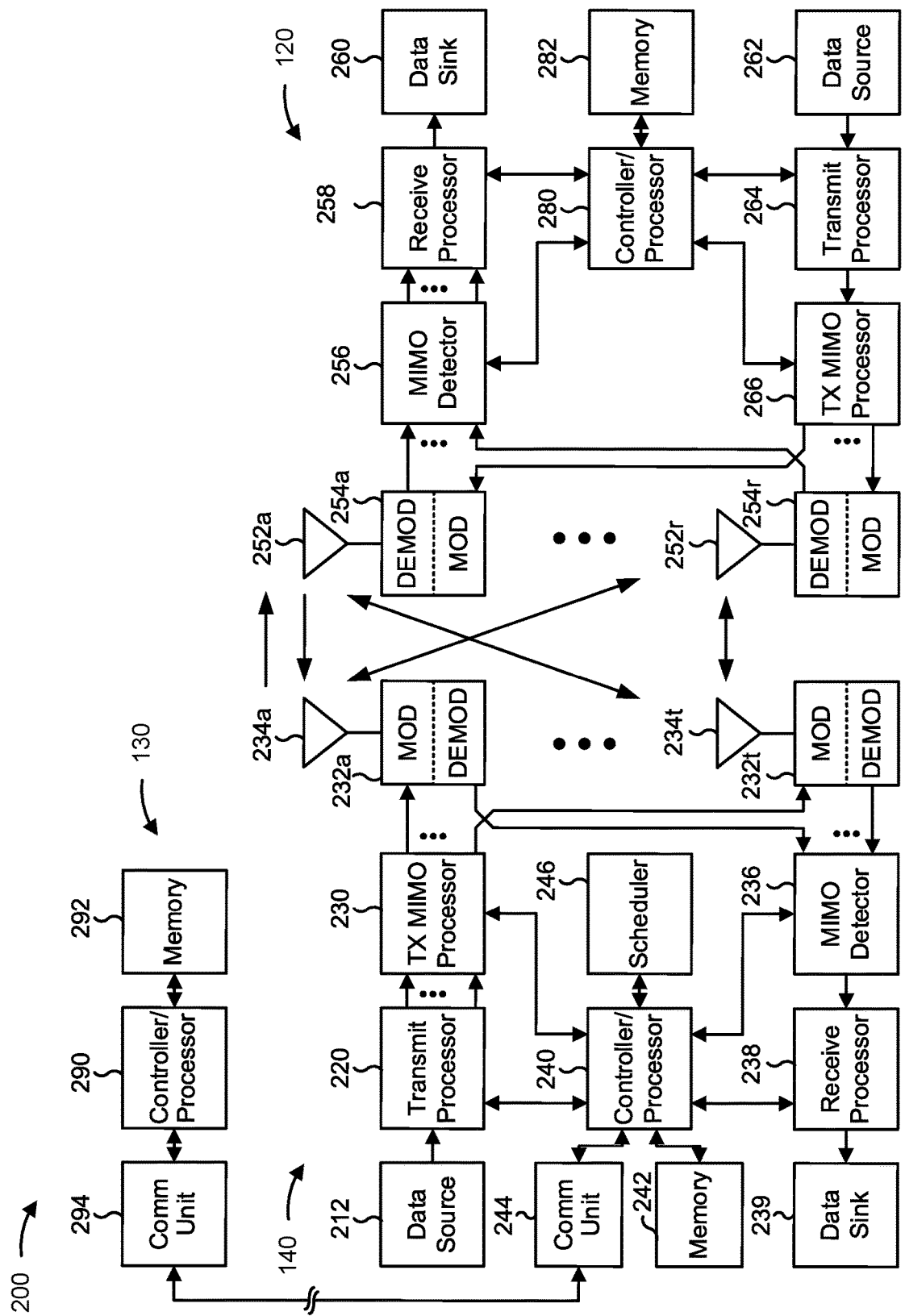
FIG. 2 is a block diagram illustrating an example of a wireless communication device in communication with a user equipment (UE) in a wireless communication network, in accordance with various aspects of the present disclosure.

FIG. 2 shows a block diagram of a design 200 of wireless communication device 140 and UE 120, which may be one of the UEs in FIG. 1. Wireless communication device 140 may be equipped with T antennas 234a through 234t, and UE 120 may be equipped with R antennas 252a through 252r, where in general T≥1 and R≥1. Wireless communication device 140 may be an RSU or a similar device in traffic infrastructure. For example, wireless communication device 140 may be an RSU on a traffic light, on a light pole of a traffic intersection, on a structure on a side of a busy street, and/or the like.

At wireless communication device 140, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from wireless communication device 140 and/or other devices (e.g., base stations) and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), or CQI. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to wireless communication device 140. At wireless communication device 140, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Wireless communication device 140 may include communication unit 244 and communicate to network controller 130 via communication unit 244. Network controller 130 may include communication unit 294, controller/processor 290, and memory 292. BS 110 may also include the components described herein for wireless communication device 140.

Controller/processor 240 of wireless communication device 140, controller/processor 280 of UE 120, and/or any other component(s) of FIG. 2 may perform one or more techniques associated with paging in V2X communications for power saving, as described in more detail elsewhere herein. For example, controller/processor 240 of wireless communication device 140, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for wireless communication device 140 and UE 120, respectively. In some aspects, memory 242 and/or memory 282 may comprise a non-transitory computer-readable medium storing one or more instructions for wireless communication. For example, the one or more instructions, when executed by one or more processors of the wireless communication device 140 and/or the UE 120, may perform or direct operations of, for example, process 800 of FIG. 8, process 900 of FIG. 9, and/or other processes as described herein. A scheduler 246 may schedule UEs for data transmission on the downlink and/or uplink.

In some aspects, UE 120 may include means for receiving a wake up signal (WUS) or a paging message from a wireless communication device, means for monitoring for V2X messages from vehicle UEs based at least in part on receiving the wake up signal or the paging message, means for receiving a V2X message from a vehicle UE based at least in part on the monitoring, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, wireless communication device 140 may include means for detecting a V2X message from a vehicle UE, means for transmitting a WUS or a paging message to a UE based at least in part on detecting the V2X message, and/or the like. In some aspects, such means may include one or more components of wireless communication device 140 described in connection with FIG. 2, such as controller/processor 240, transmit processor 220, TX MIMO processor 230, MOD 232, antenna 234, DEMOD 232, MIMO detector 236, receive processor 238, and/or the like.

As indicated above, FIG. 2 is provided as an example. Other examples may differ from what is described with regard to FIG. 2.

With a goal of improving public safety and traffic efficiency on roads, standards have been developed to enable vehicles to communicate or exchange information with other vehicles. For example, an emergency vehicle may send out a special message to other vehicles on a road, and the other vehicles may alert the respective vehicle drivers. Vehicles may also periodically exchange their location, speed, and direction information with each other. This is referred to as vehicle-to-vehicle (V2V) communication. To make V2V possible, the Institute of Electrical and Electronics Engineers (IEEE) 802.11p standard was amended to provide support for V2V, and 3GPP introduced Proximity Services (ProSe) in Release 12 and further enhanced ProSe in Release 14 for V2V. Vehicles may also communicate with pedestrians using vehicle-to-pedestrian (V2P) communications, communicate with infrastructure (e.g., a traffic light, a lane signal, a sensor, a traffic controller system, and/or the like) using vehicle-to-infrastructure (V2I) communications, and communicate with a network using vehicle-to-network (V2N) communications. All of these communications may be referred to generically as vehicle-to-everything (V2X) communications.

Figure 3:
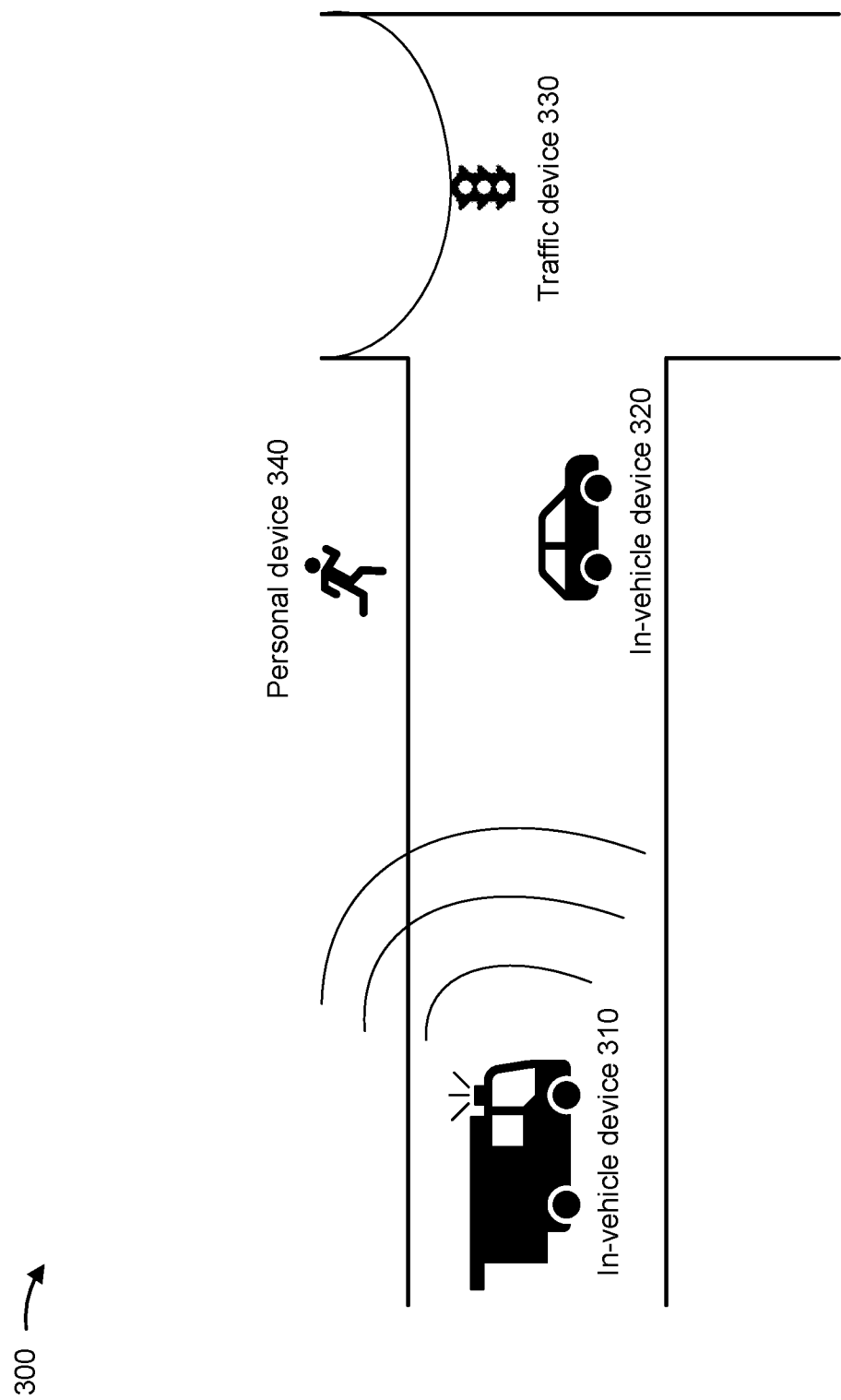
FIG. 3 is a diagram illustrating an example of vehicle-to-everything (V2X) communications, in accordance with various aspects of the present disclosure.

FIG. 3 is a diagram illustrating an example 300 of V2X communications. A fire truck traveling on a road may have an in-vehicle device 310 that broadcasts messages that may be received by an in-vehicle device 320 of a car, a traffic device 330 of a traffic light in an intersection, and/or a personal device 340 of a pedestrian. For example, in-vehicle device 310 of the fire truck may broadcast a V2X communication that includes information indicating that it is an emergency vehicle and that includes information about its location, speed, and direction. In-vehicle device 320 may receive the V2X communication and provide a driver with an alert that a fire truck is approaching quickly behind the driver, so that the driver knows to get out of the way. Traffic device 330 of the traffic light in the intersection may receive the V2X communication and prepare to green light the fire truck through the intersection. Personal device 340, worn by the pedestrian, may receive the V2X communication and alert the pedestrian to the approaching fire truck as the pedestrian nears a pedestrian crossing at the intersection.

As indicated above, FIG. 3 is provided as an example. Other examples may differ from what is described with regard to FIG. 3.

Recently, 3GPP has introduced cellular V2X (C-V2X), which is growing in use. C-V2X communication is based on direct communication or communication via a network. C-V2X may use a sidelink interface for the direct communication. Sidelink refers to direct device-to-device (D2D) communications between devices rather than uplink communications to a base station or downlink communications from the base station.

A sidelink channel may include a physical sidelink control channel (PSCCH) and a physical sidelink shared channel (PSSCH). A PSCCH may be used to communicate control information, similar to a physical downlink control channel (PDCCH) and/or a physical uplink control channel (PUCCH) used for communications with a base station. A PSSCH may be used to communicate data, similar to a physical downlink shared channel (PDSCH) and/or a physical uplink shared channel (PUSCH) used for communications with a base station. For example, a PSCCH may carry sidelink control information (SCI), which may indicate various control information used for sidelink communications, such as one or more resources (e.g., time, frequency, and/or beam resources) where a transport block (TB) that includes data is carried on a PSSCH, and/or other control information that may be used to assist in receiving, decoding, and/or demodulating data carried via PSSCH. The TB may include C-V2X data, such as a basic safety message (BSM), a traffic information message (TIM), a signal phase and time (SPAT) message, a MAP message to convey geographic road information, a cooperative awareness message (CAM), a distributed environment notification message (DENM), an in-vehicle information (IVI) message, and/or the like. C-V2X data may include data relevant to operation of a vehicle associated with a UE.

A UE may operate using transmission mode 4, where resource selection and/or scheduling is performed by the UE (e.g., rather than a base station). The UE may perform resource selection and/or scheduling by sensing channel availability for transmissions. For example, the UE may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, may measure an RSRQ parameter (e.g., a PSSCH-RSRQ parameter) associated with various sidelink channels, and may select a channel for transmission of C-V2X communications based at least in part on such measurements.

Additionally, or alternatively, the UE may perform resource selection and/or scheduling using SCI received in a PSCCH, which may indicate occupied resources, channel parameters, and/or the like. Additionally, or alternatively, the UE may perform resource selection and/or scheduling by determining a channel busy rate (CBR) associated with a sidelink channel, which may be used for rate control (e.g., by indicating a maximum number of resource blocks that the UE can use for a particular set of subframes).

The UE may communicate with other UEs using one or more beams. For example, the UEs may include multiple antenna elements to support beamforming using millimeter wave beams in a millimeter wave frequency band. In some aspects, the UE may support and/or dynamically configure different beam widths for a beam. A millimeter wave beam may be capable of higher throughput than a sub-6 GHz transmission, which may be useful for C-V2X communications (e.g., to transmit camera feeds). As shown, a first UE may communicate with a second UE using an active beam.

A vehicle UE (V-UE) may communicate with a pedestrian UE (P-UE) via a sidelink channel. This may be referred to as a V2P communication, which is considered to be a V2X message. However, P-UEs involved in sidelink communications may be sensitive to power consumption. Unlike a V-UE, which may be an on-board unit connected to a power source of a vehicle, a P-UE may be a cell phone or smart wearable device that cannot afford to continuously monitor for transmissions from other UEs such as V-UEs. The P-UE has power limitations, and continuously monitoring for V2X messages uses power and signaling resources.

Some aspects herein provide techniques and apparatuses for a low power communication protocol for V2P communications, including paging for V2X communication for power saving. For example, a roadside unit (RSU) may monitor for V2X messages from V-UEs. The RSU may transmit a wake up signal (WUS) or a paging message to wake up the P-UE based at least in part on detecting V2X messages. If the RSU is a UE type RSU that communicates with other UEs (e.g., V-UE. P-UE) over a sidelink, the RSU may transmit the WUS or the paging message on a sidelink. If the RSU is a base station type RSU (e.g., eNB, gNB) that communicates with UEs (e.g., V-UE, P-UE) over a downlink and an uplink, the RSU may transmit the WUS or the paging message to the P-UE on a downlink.

The P-UE may monitor for and receive V2X messages based at least in part on receiving the WUS or the paging message from the RSU. In this way, the P-UE only awaits a WUS or a paging message from an RSU. The P-UE may wake up to receive V2X transmissions on a sidelink channel if a WUS or paging message from an RSU is detected, and otherwise enter or remain in an inactive mode with respect to V2X messages (or other sidelink communications). The P-UE may thus save power and signaling resources.

Figure 4:
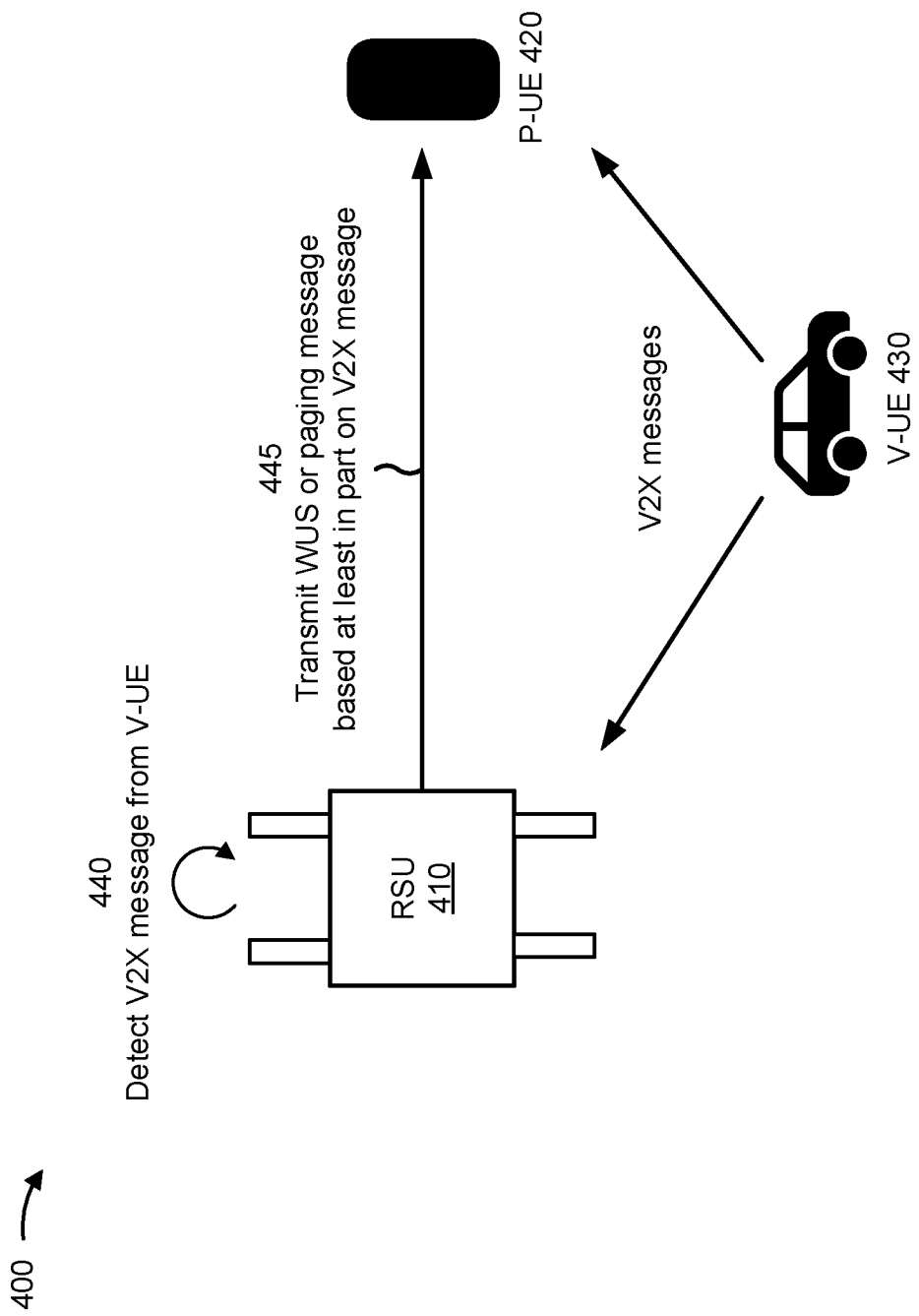
FIG. 4 is a block diagram illustrating an example of paging in V2X communications for power saving, in accordance with various aspects of the present disclosure.

FIG. 4 is a block diagram illustrating an example 400 of paging in V2X communications for power saving, in accordance with various aspects of the present disclosure. FIG. 4 illustrates an RSU 410 (e.g., wireless communication device 140 depicted in FIGS. 1 and 2) that may communicate with a P-UE 420 (e.g., UE 120 depicted in FIGS. 1 and 2).

RSU 410 and P-UE 420 may be configured to receive V2X messages from a V-UE 430. For example, V-UE 430 may transmit V2X messages, which may include V2P messages, safety messages, or other sidelink communications. As shown in FIG. 4, P-UE 420 is dark to illustrate that P-UE 420 is not monitoring for V2X messages (or other sidelink communications from UEs), in order to save power.

As shown by reference number 440, RSU 410 may detect a V2X message from a V-UE, such as from V-UE 430. The V2X messages may include information about a speed, direction, or location of V-UE 430, safety messages, and/or V2P messages. As shown by reference number 445, RSU 410 may transmit a WUS or a paging message based at least in part on detecting the V2X message. In some aspects, RSU 410 may transmit the WUS or the paging message immediately upon detecting the V2X message. RSU 410 may transmit the WUS or the paging message in a dedicated resource where P-UE 420 monitors for such messages from RSU 410, or from other RSUs. The dedicated resource may be a resource pool (pre)configured for WUS or paging transmission, or dedicated resources in a resource pool, where the dedicated resources have a dedicated time window or a specific time or frequency resource. The specific time or frequency resource may be a (pre)configured time window, a configured set of time and frequency resources, dedicated frequency range, and/or the like. This monitoring is less power consuming than continuously monitoring for V2X messages, which may come in various SCI formats with various SCI parameters, depending on a version of a V-UE.

In some aspects, RSU 410 transmits the WUS or the paging message, upon detecting a V2X message, based at least in part on a determination of whether there is a potential risk to P-UE 420. A property (e.g., distance to V-UE) of P-UE 420 may be compared to a risk threshold (e.g., minimum distance). For example, RSU 410 may be aware of a location of V-UE 430 and a location of P-UE 420. RSU 410 may transmit the WUS or the paging message based at least in part on a determination that a distance between P-UE 420 and V-UE 430 is smaller than a safe distance threshold. This may be to wake up P-UE 420 so as to avoid a collision or other traffic-related event.

As indicated above, FIG. 4 is provided as an example. Other examples may differ from what is described with regard to FIG. 4.

Figure 5:
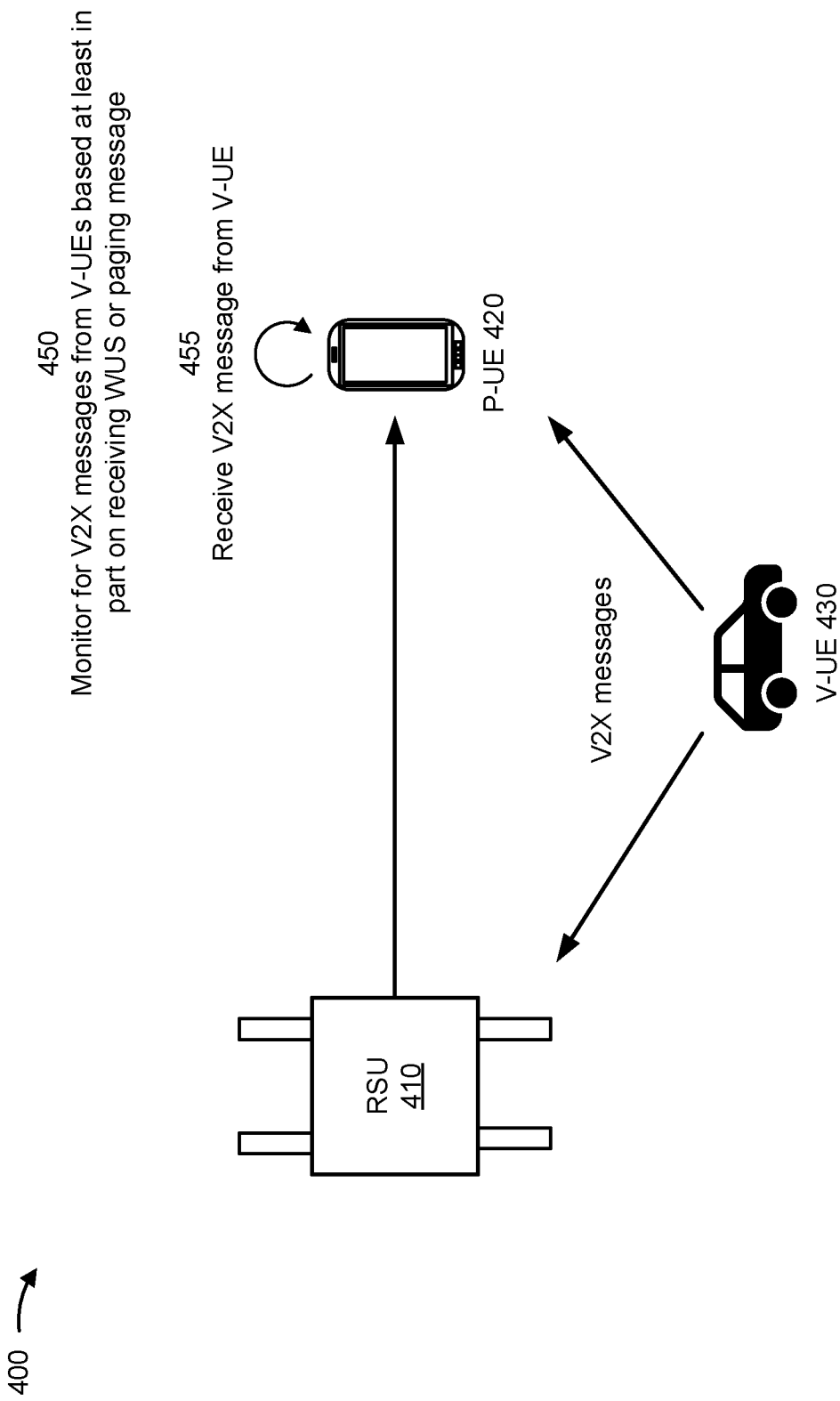
FIG. 5 is a block diagram illustrating a continuation of the example in FIG. 4 of paging in V2X communications for power saving, in accordance with various aspects of the present disclosure.

FIG. 5 is a block diagram illustrating a continuation of example 400 of paging in V2X communications for power saving, in accordance with various aspects of the present disclosure.

As shown by reference number 450, P-UE 420 may monitor for V2X messages from V-UEs based at least in part on receiving the WUS or the paging message. In some aspects, P-UE 420 may monitor for V2X messages from a specific V-UE. As shown by reference number 455, P-UE 420 may receive a V2X message from a V-UE, such as V-UE 430. P-UE 420 may monitor for V2X messages from V-UEs in a sidelink channel. In some aspects, P-UE 420 may receive V2X messages in a resource from a pool of resources.

In some aspects, P-UE 420 may receive the V2X message in a dedicated resource, such as a dedicated time window or a specific time or frequency resource. For example, the dedicated time window may be a time window that is specified for receiving a V2X message and/or other specific messages. The WUS or the paging message may indicate or imply the dedicated resource.

As indicated above, FIG. 5 is provided as an example. Other examples may differ from what is described with regard to FIG. 5.

Figure 6:
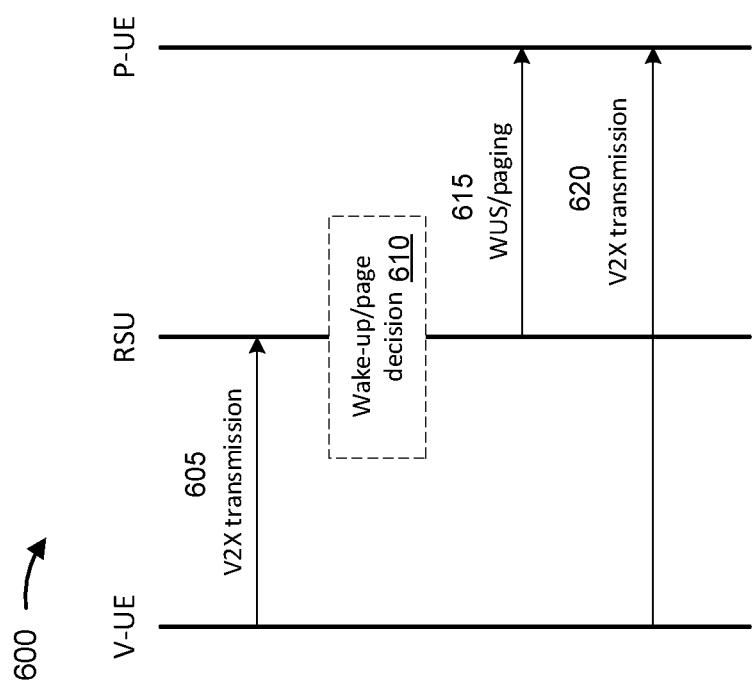
FIG. 6 is a signaling diagram illustrating an example of paging in V2X communications for power saving, in accordance with various aspects of the present disclosure.

FIG. 6 is a signaling diagram illustrating an example 600 of paging in V2X communications for power saving, in accordance with various aspects of the present disclosure. FIG. 6 shows signaling between a V-UE (e.g., V-UE 430 depicted in FIGS. 4 and 5), an RSU (e.g., RSU 410 depicted in FIGS. 4 and 5), and a P-UE (e.g., P-UE 420 depicted in FIGS. 4 and 5).

As shown by reference number 605, the V-UE may send a V2X transmission to the RSU. As shown by reference number 610, the RSU may decide whether to send a WUS or a paging message to the P-UE. For example, the RSU may decide whether the V2X transmission is safety-related such that future V2X transmission messages from the V-UE may be important to a safety of the P-UE. The RSU may make such decisions based at least in part on comparing information in the V2X transmission or indicated by the V2X transmission to one or more thresholds that may be related to a distance, a speed, a location, a message type, a traffic density, a time of day, a V-UE type, a P-UE type, ownership, and/or a relation between the V-UE and the P-UE.

As shown by reference number 615, the RSU may send a WUS or a paging message to the P-UE based at least in part on a decision of the RSU. The WUS or the paging message may be a dedicated signal (e.g., a sequence), or SCI with certain parameters or a certain format. The WUS or the paging message may be common to all P-UEs (e.g., broadcast), specific to the P-UE, or specific to a group of UEs.

As shown by reference number 620, the P-UE may monitor for and receive a V2X transmission. The V2X transmission may be a related V2X transmission, a duplicate or retransmission of the V2X transmission detected by the RSU, or a new V2X transmission.

As indicated above, FIG. 6 is provided as an example. Other examples may differ from what is described with regard to FIG. 6.

Figure 7:
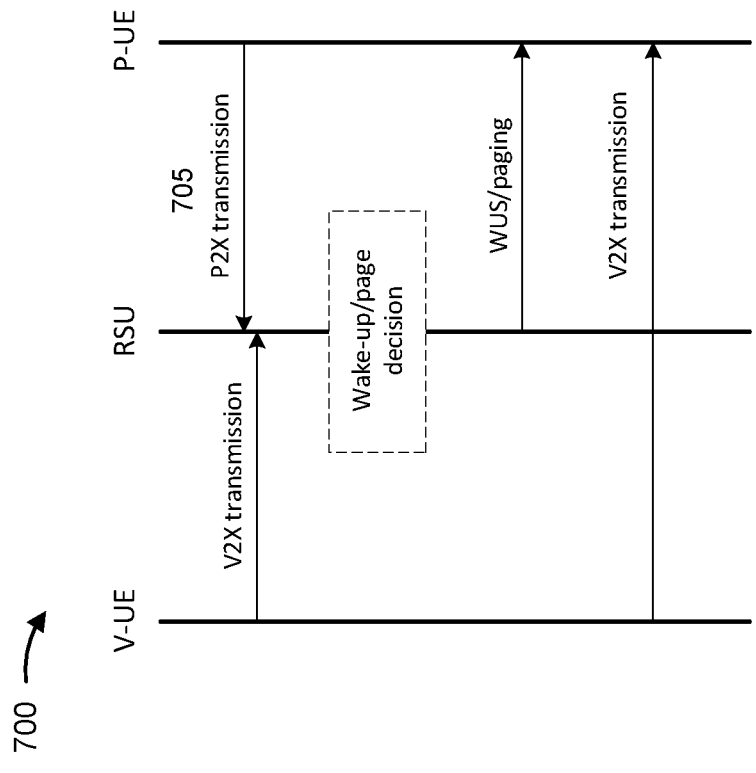
FIG. 7 is a signaling diagram illustrating an example of paging in V2X communications for power saving, in accordance with various aspects of the present disclosure.

FIG. 7 is a signaling diagram illustrating an example 700 of paging in V2X communications for power saving, in accordance with various aspects of the present disclosure. FIG. 7 shows signaling between a V-UE (e.g., V-UE 430), an RSU (e.g., RSU 410), and a P-UE (e.g., P-UE 420).

Additionally, or alternatively, as shown by reference number 705, the RSU may be triggered to send the WUS or the paging message based at least in part on receiving a communication from the P-UE. The communication may be, for example, a P-UE to everything (P2X) transmission. In some aspects, the P2X transmission may be a pedestrian safety message, which may be transmitted periodically or upon entering a certain geographical area. If the RSU detects the P-UE transmission, the RSU may be aware of a presence of the P-UE, and the RSU may wake up or page the P-UE for receiving on a sidelink channel from V-UEs if a V2X message is detected. In some aspects, the P2X transmission may be a message registering the P-UE with the RSU so the RSU is at least aware of the presence of the P-UE in its vicinity.

In some aspects, the RSU may only wake up or page the P-UE if a certain type of V2X message is detected. For example, the V2X message may need to be a safety message from a V-UE before the RSU notifies the P-UE. The certain type may be indicated by SCI parameters or an SCI format. The RSU may identify a type or age of the V2X message based on the SCI parameters or format. For example, some V-UEs that follow a certain specification may send a WUS or a paging message to wake up the P-UE without help from the RSU. Other V-UEs of an older specification may not have that WUS or paging functionality, so the RSU may act on behalf of the V-UEs with the older specification.

As indicated above, FIG. 7 is provided as an example. Other examples may differ from what is described with regard to FIG. 7.

Figure 8:
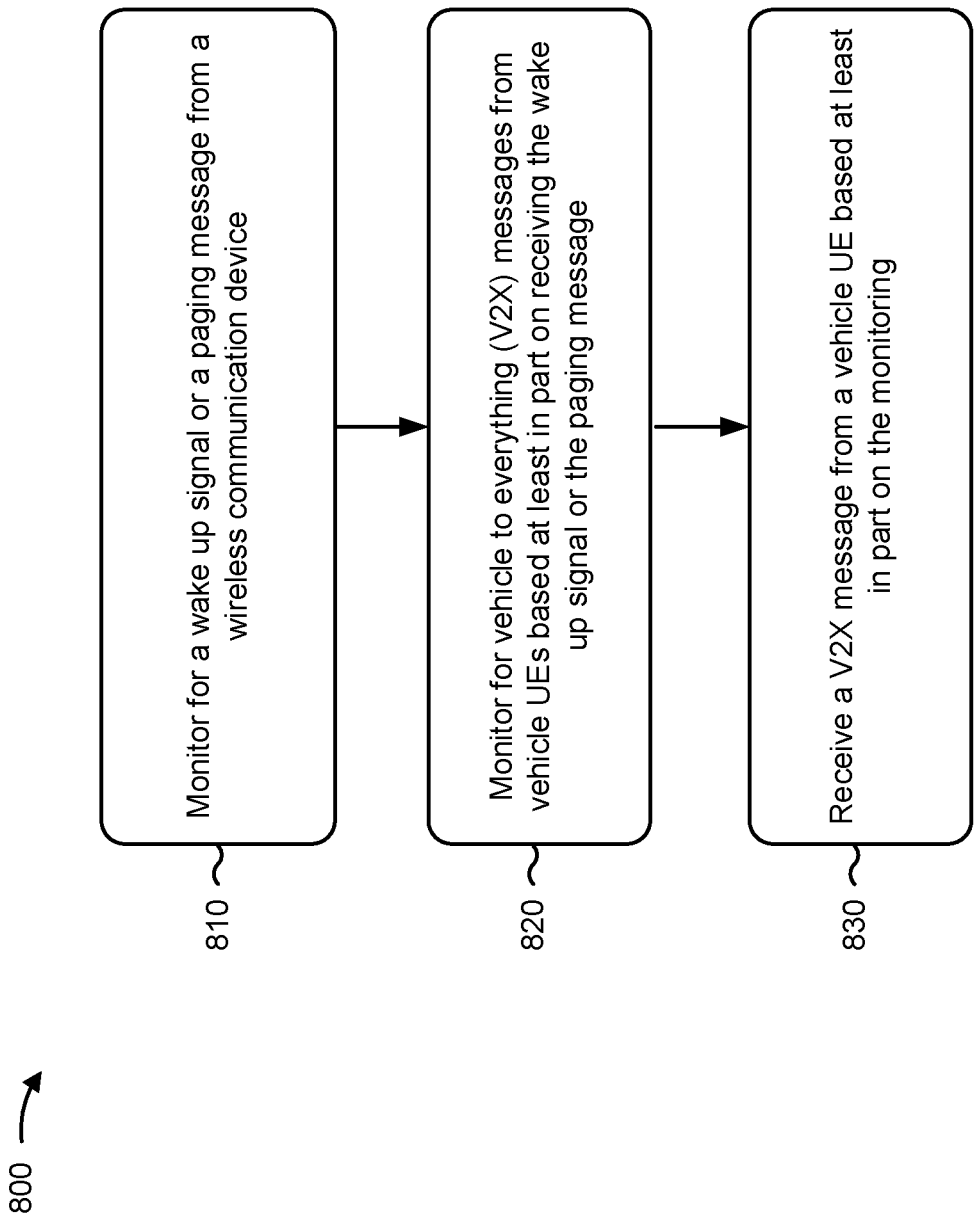
FIG. 8 is a diagram illustrating an example process performed by a UE, in accordance with various aspects of the present disclosure.

FIG. 8 is a diagram illustrating an example process 800 performed, for example, by a UE, in accordance with various aspects of the present disclosure. Example process 800 is an example where the UE (e.g., UE 120 depicted in FIGS. 1 and 2, personal device 340 depicted in FIG. 3, P-UE 420 depicted in FIG. 4) performs operations associated with paging in V2X communications for power saving.

As shown in FIG. 8, in some aspects, process 800 may include monitoring for a WUS or a paging message from a wireless communication device (block 810). For example, the UE (e.g., using receive processor 258, transmit processor 264, controller/processor 280, memory 282) may monitor for a WUS or a paging message from a wireless communication device, as described above.

As further shown in FIG. 8, in some aspects, process 800 may include monitoring for V2X messages from vehicle UEs based at least in part on receiving the WUS or the paging message (block 820). For example, the UE (e.g., using receive processor 258, transmit processor 264, controller/processor 280, memory 282) may monitor for V2X messages from vehicle UEs based at least in part on receiving the wake up signal or the paging message, as described above.

As further shown in FIG. 8, in some aspects, process 800 may include receiving a V2X message from a vehicle UE based at least in part on the monitoring (block 830). For example, the UE (e.g., using receive processor 258, transmit processor 264, controller/processor 280, memory 282) may receive a V2X message from a vehicle UE based at least in part on the monitoring, as described above.

Process 800 may include additional aspects, such as any single aspect or any combination of aspects described below and/or in connection with one or more other processes described elsewhere herein.

In a first aspect, the wireless communication device is a roadside unit.

In a second aspect, alone or in combination with the first aspect, monitoring for the wake up signal or the paging message includes monitoring for the wake up signal or the paging message in a time window for receiving the wake up signal or the paging message.

In a third aspect, alone or in combination with one or more of the first and second aspects, process 800 includes refraining from monitoring for the wake up signal or the paging message outside of the time window.

In a fourth aspect, alone or in combination with one or more of the first through third aspects, monitoring for the wake up signal or the paging message includes monitoring for the wake up signal or the paging message in a specific time or frequency resource.

In a fifth aspect, alone or in combination with one or more of the first through fourth aspects, receiving the V2X message includes receiving the V2X message in a time window (e.g., dedicated time window).

In a sixth aspect, alone or in combination with one or more of the first through fifth aspects, receiving the V2X message includes receiving the V2X message in a specific time or frequency resource.

In a seventh aspect, alone or in combination with one or more of the first through sixth aspects, the wake up signal or the paging message is common to multiple UEs including the UE.

In an eighth aspect, alone or in combination with one or more of the first through seventh aspects, the wake up signal or the paging message is specific to the UE.

In a ninth aspect, alone or in combination with one or more of the first through eighth aspects, the wake up signal or the paging message is specific to a group of UEs including the UE.

In a tenth aspect, alone or in combination with one or more of the first through ninth aspects, receiving the wake up signal or the paging message includes receiving the wake up signal or the paging message based at least in part on transmitting the communication.

In an eleventh aspect, alone or in combination with one or more of the first through tenth aspects, the communication indicates a resource for receiving the wake up signal or the paging message.

In a twelfth aspect, alone or in combination with one or more of the first through eleventh aspects, the communication is a registration message to register the UE with the wireless communication device.

In a thirteenth aspect, alone or in combination with one or more of the first through twelfth aspects, the wake up signal or the paging message is a dedicated signal or sidelink control information.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
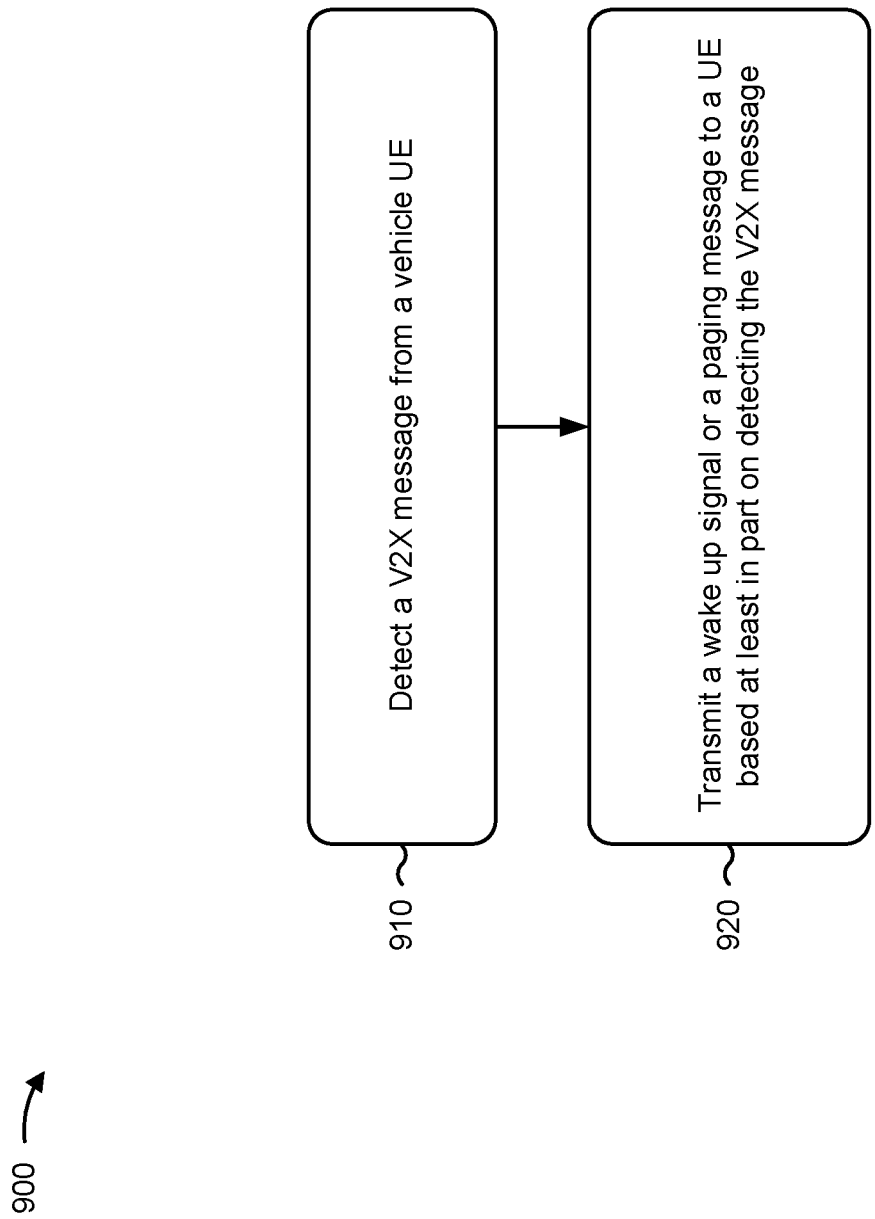
FIG. 9 is a diagram illustrating an example process performed by a wireless communication device, in accordance with various aspects of the present disclosure.

FIG. 9 is a diagram illustrating an example process 900 performed, for example, by a wireless communication device, in accordance with various aspects of the present disclosure. Example process 900 is an example where the wireless communication device (e.g., wireless communication device 140 depicted in FIGS. 1 and 2, traffic device 330 depicted in FIG. 3, RSU 410 depicted in FIG. 4) performs operations associated with paging in V2X communications for power saving.

As shown in FIG. 9, in some aspects, process 900 may include detecting a V2X message from a vehicle UE (block 910). For example, the wireless communication device (e.g., using transmit processor 220, receive processor 238, controller/processor 240, memory 242) may detect a V2X message from a vehicle UE, as described above.

As further shown in FIG. 9, in some aspects, process 900 may include transmitting a wake up signal or a paging message to a UE based at least in part on detecting the V2X message (block 920). For example, the wireless communication device (e.g., using transmit processor 220, receive processor 238, controller/processor 240, memory 242) may transmit a wake up signal or a paging message to a UE based at least in part on detecting the V2X message, as described above.

Process 900 may include additional aspects, such as any single aspect or any combination of aspects described below and/or in connection with one or more other processes described elsewhere herein.

In a first aspect, the wireless communication device is a roadside unit.

In a second aspect, alone or in combination with the first aspect, process 900 includes receiving a communication from the UE and transmitting the wake up signal or the paging message includes transmitting the wake up signal or the paging message based at least in part on receiving the communication.

In a third aspect, alone or in combination with one or more of the first and second aspects, transmitting the wake up signal or the paging message includes transmitting the wake up signal or the paging message in a resource indicated by the communication.

In a fourth aspect, alone or in combination with one or more of the first through third aspects, the communication is a safety message periodically transmitted by the UE.

In a fifth aspect, alone or in combination with one or more of the first through fourth aspects, the communication is a registration message to register the UE with the wireless communication device.

In a sixth aspect, alone or in combination with one or more of the first through fifth aspects, transmitting the wake up signal or the paging message includes comparing a property of the UE and a risk threshold, and transmitting the wake up signal or the paging message based at least in part on a result of the comparing.

In a seventh aspect, alone or in combination with one or more of the first through sixth aspects, the property of the UE is a distance between the UE and the vehicle UE.

In an eighth aspect, alone or in combination with one or more of the first through seventh aspects, process 900 includes monitoring for V2X messages on a sidelink channel.

In a ninth aspect, alone or in combination with one or more of the first through eighth aspects, transmitting the wake up signal or the paging message includes transmitting the wake up signal or the paging message in a time window for transmitting the wake up signal or the paging message.

In a tenth aspect, alone or in combination with one or more of the first through ninth aspects, process 900 includes refraining from transmitting the wake up signal or the paging message outside of the time window.

In an eleventh aspect, alone or in combination with one or more of the first through tenth aspects, transmitting the wake up signal or the paging message includes transmitting the wake up signal or the paging message in a specific time or frequency resource.

In a twelfth aspect, alone or in combination with one or more of the first through eleventh aspects, transmitting the wake up signal or the paging message includes transmitting the wake up signal or the paging message on behalf of a plurality of vehicle UEs.

In a thirteenth aspect, alone or in combination with one or more of the first through twelfth aspects, transmitting the wake up signal or the paging message includes transmitting the wake up signal or the paging message based at least in part on a type of the V2X message.

In a fourteenth aspect, alone or in combination with one or more of the first through thirteenth aspects, the wake up signal or the paging message includes one or more of a sequence or sidelink control information of a given format.

In a fifteenth aspect, alone or in combination with one or more of the first through fourteenth aspects, the wake up signal or the paging message is common to multiple UEs including the UE.

In a sixteenth aspect, alone or in combination with one or more of the first through fifteenth aspects, the wake up signal or the paging message is specific to the UE.

In a seventeenth aspect, alone or in combination with one or more of the first through sixteenth aspects, the wake up signal or the paging message is specific to a group of UEs including the UE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The following provides an overview of aspects of the present disclosure:

Aspect 1: A method of wireless communication performed by a user equipment (UE), comprising: monitoring for a wake up signal or a paging message from a wireless communication device; monitoring for vehicle to everything (V2X) messages from vehicle UEs based at least in part on receiving the wake up signal or the paging message; and receiving a V2X message from a vehicle UE based at least in part on the monitoring.

Aspect 2: The method of aspect 1, wherein the wireless communication device is a roadside unit.

Aspect 3: The method of aspect 1 or 2, wherein monitoring for the wake up signal or the paging message includes monitoring for the wake up signal or the paging message in a time window for receiving the wake up signal or the paging message.

Aspect 4: The method of aspect 3, further comprising refraining from monitoring for the wake up signal or the paging message outside of the time window.

Aspect 5: The method of any of aspects 1-4, wherein monitoring for the wake up signal or the paging message includes monitoring for the wake up signal or the paging message in a specific time or frequency resource.

Aspect 6: The method of any of aspects 1-5, wherein receiving the V2X message includes receiving the V2X message in a time window.

Aspect 7: The method of any of aspects 1-6, wherein receiving the V2X message includes receiving the V2X message in a specific time or frequency resource.

Aspect 8: The method of any of aspects 1-7, wherein the wake up signal or the paging message is common to multiple UEs including the UE.

Aspect 9: The method of any of aspects 1-7, wherein the wake up signal or the paging message is specific to the UE.

Aspect 10: The method of any of aspects 1-7, wherein the wake up signal or the paging message is specific to a group of UEs including the UE.

Aspect 11: The method of any of aspects 1-10, further comprising transmitting a communication to the wireless communication device, and wherein receiving the wake up signal or the paging message includes receiving the wake up signal or the paging message based at least in part on transmitting the communication.

Aspect 12: The method of aspect 11, wherein the communication indicates a resource for receiving the wake up signal or the paging message.

Aspect 13: The method of aspect 11, wherein the communication is a registration message to register the UE with the wireless communication device.

Aspect 14: The method of any of aspects 1-13, wherein the wake up signal or the paging message is a dedicated signal or sidelink control information.

Aspect 15: A method of wireless communication performed by a wireless communication device, comprising: detecting a vehicle to everything (V2X) message from a vehicle user equipment (UE); and transmitting a wake up signal or a paging message to a UE based at least in part on detecting the V2X message.

Aspect 16: The method of aspect 15, wherein the wireless communication device is a roadside unit.

Aspect 17: The method of aspect 15 or 16, further comprising receiving a communication from the UE, and wherein transmitting the wake up signal or the paging message includes transmitting the wake up signal or the paging message based at least in part on receiving the communication.

Aspect 18: The method of aspect 17, wherein transmitting the wake up signal or the paging message includes transmitting the wake up signal or the paging message in a resource indicated by the communication.

Aspect 19: The method of aspect 17, wherein the communication is a safety message periodically transmitted by the UE.

Aspect 20: The method of aspect 17, wherein the communication is a registration message to register the UE with the wireless communication device.

Aspect 21: The method of any of aspects 15-20, wherein transmitting the wake up signal or the paging message includes comparing a property of the UE and a risk threshold and transmitting the wake up signal or the paging message based at least in part on a result of the comparing.

Aspect 22: The method of aspect 21, wherein the property of the UE is a distance between the UE and the vehicle UE.

Aspect 23: The method of any of aspects 15-22, further comprising monitoring for V2X messages on a sidelink channel.

Aspect 24: The method of any of aspects 15-23, wherein transmitting the wake up signal or the paging message includes transmitting the wake up signal or the paging message in a time window for transmitting the wake up signal or the paging message.

Aspect 25: The method of aspect 24, further comprising refraining from transmitting the wake up signal or the paging message outside of the time window.

Aspect 26: The method of any of aspects 15-25, wherein transmitting the wake up signal or the paging message includes transmitting the wake up signal or the paging message in a specific time or frequency resource.

Aspect 27: The method of any of aspects 15-26, wherein transmitting the wake up signal or the paging message includes transmitting the wake up signal or the paging message on behalf of a plurality of vehicle UEs.

Aspect 28: The method of any of aspects 15-27, wherein transmitting the wake up signal or the paging message includes transmitting the wake up signal or the paging message based at least in part on a type of the V2X message.

Aspect 29: The method of any of aspects 15-28, wherein the wake up signal or the paging message includes one or more of a sequence or sidelink control information of a given format.

Aspect 30: The method of any of aspects 15-29, wherein the wake up signal or the paging message is common to multiple UEs including the UE.

Aspect 31: The method of any of aspects 15-29, wherein the wake up signal or the paging message is specific to the UE.

Aspect 32: The method of any of aspects 15-29, wherein the wake up signal or the paging message is specific to a group of UEs including the UE.

Aspect 33: An apparatus for wireless communication at a device, comprising a processor; memory coupled with the processor; and instructions stored in the memory and executable by the processor to cause the apparatus to perform the method of one or more aspects of aspects 1-32.

Aspect 34: A device for wireless communication, comprising a memory and one or more processors coupled to the memory, the memory and the one or more processors configured to perform the method of one or more aspects of aspects 1-32.

Aspect 35: An apparatus for wireless communication, comprising at least one means for performing the method of one or more aspects of aspects 1-32.

Aspect 36: A non-transitory computer-readable medium storing code for wireless communication, the code comprising instructions executable by a processor to perform the method of one or more aspects of aspects 1-32.

Aspect 37: A non-transitory computer-readable medium storing a set of instructions for wireless communication, the set of instructions comprising one or more instructions that, when executed by one or more processors of a device, cause the device to perform the method of one or more aspects of aspects 1-32.

The foregoing disclosure provides illustration and description, but is not intended to be exhaustive or to limit the aspects to the precise form disclosed. Modifications and variations may be made in light of the above disclosure or may be acquired from practice of the aspects. As used herein, the term "component" is intended to be broadly construed as hardware, firmware, and/or a combination of hardware and software. As used herein, a processor is implemented in hardware, firmware, and/or a combination of hardware and software.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A user equipment (UE) for wireless communication, comprising:
   a memory; and
   one or more processors coupled to the memory, the memory and the one or more processors configured to:
      receive a wake up signal or a paging message from a wireless communication device based at least in part on a distance between the UE and a vehicle UE being less than a threshold distance,
         wherein the wake up signal or the paging message is received from the wireless communication device based at least in part on the wireless communication device determining that the vehicle UE does not include a wake up signal functionality or a paging functionality;
      monitor for vehicle to everything (V2X) messages from vehicle UEs based at least in part on receiving the wake up signal or the paging message; and
      receive a V2X message from the vehicle UE based at least in part on the monitoring.

2. The UE of claim 1, wherein the wireless communication device is a roadside unit.

3. The UE of claim 1, wherein the one or more processors are further configured to monitor for the wake up signal or the paging message in a time window for receiving the wake up signal or the paging message.

4. The UE of claim 3, wherein the one or more processors are further configured to refrain from monitoring for the wake up signal or the paging message outside of the time window.

5. The UE of claim 1, wherein the one or more processors are further configured to monitor for the wake up signal or the paging message in a specific time resource or a specific frequency resource.

6. The UE of claim 1, wherein the one or more processors, when receiving the V2X message, are configured to receive the V2X message in a time window.

7. The UE of claim 1, wherein the one or more processors, when receiving the V2X message, are configured to receive the V2X message in a specific time or frequency resource.

8. The UE of claim 1, wherein the wake up signal or the paging message is common to multiple UEs including the UE.

9. The UE of claim 1, wherein the wake up signal or the paging message is specific to the UE.

10. The UE of claim 1, wherein the wake up signal or the paging message is specific to a group of UEs including the UE.

11. The UE of claim 1, wherein the one or more processors are further configured to transmit a communication to the wireless communication device and receive the wake up signal or the paging message based at least in part on transmitting the communication.

12. The UE of claim 11, wherein the communication indicates a resource for receiving the wake up signal or the paging message.

13. The UE of claim 11, wherein the communication is a registration message to register the UE with the wireless communication device.

14. The UE of claim 1, wherein the wake up signal or the paging message is a dedicated signal or sidelink control information.

15. A wireless communication device for wireless communication, comprising:
   a memory; and
   one or more processors coupled to the memory, the one or more processors configured to:
      detect a vehicle to everything (V2X) message from a vehicle user equipment (UE); and
      transmit a wake up signal or a paging message to a UE based at least in part on a distance between the vehicle UE and the UE being less than a threshold distance and based at least in part on a determination that the vehicle UE does not include a wake up signal functionality or a paging functionality.

16. The wireless communication device of claim 15, wherein the wireless communication device is a roadside unit.

17. The wireless communication device of claim 15, wherein the one or more processors are further configured to receive a communication from the UE and transmit the wake up signal or the paging message based at least in part on receiving the communication.

18. The wireless communication device of claim 17, wherein the one or more processors, when transmitting the wake up signal or the paging message, are configured to transmit the wake up signal or the paging message in a resource indicated by the communication.

19. The wireless communication device of claim 17, wherein the communication is one or more of a safety message periodically transmitted by the UE or a registration message to register the UE with the wireless communication device.

20. The wireless communication device of claim 15, wherein the one or more processors, when transmitting the wake up signal or the paging message, are configured to compare a property of the UE and a risk threshold and transmit the wake up signal or the paging message based at least in part on a result of the comparing.

21. The wireless communication device of claim 20, wherein the property of the UE includes one or more of a location of the UE, a speed of the UE, or a traffic density associated with the UE.

22. The wireless communication device of claim 15, wherein the one or more processors are further configured to monitor for V2X messages on a sidelink channel.

23. The wireless communication device of claim 15, wherein the one or more processors, when transmitting the wake up signal or the paging message, are configured to transmit the wake up signal or the paging message in a time window for transmitting the wake up signal or the paging message.

24. The wireless communication device of claim 23, wherein the one or more processors are further configured to refrain from transmitting the wake up signal or the paging message outside of the time window.

25. The wireless communication device of claim 15, wherein the one or more processors, when transmitting the wake up signal or the paging message, are configured to transmit the wake up signal or the paging message in a specific time or frequency resource.

26. The wireless communication device of claim 15, wherein the one or more processors, when transmitting the wake up signal or the paging message, are configured to transmit the wake up signal or the paging message on behalf of a plurality of vehicle UEs.

27. The wireless communication device of claim 15, wherein the one or more processors are further configured to determine that the vehicle UE does not include the wake up signal functionality or the paging functionality based at least in part on a type of the V2X message.

28. The wireless communication device of claim 15, wherein the wake up signal or the paging message includes one or more of a sequence or sidelink control information of a given format.

29. The wireless communication device of claim 15, wherein the wake up signal or the paging message is common to multiple UEs including the UE.

30. The wireless communication device of claim 15, wherein the wake up signal or the paging message is specific to the UE.

* * * * *